(12) United States Patent
Ondrus, Jr. et al.

(10) Patent No.: US 6,328,652 B1
(45) Date of Patent: Dec. 11, 2001

(54) INTERNAL TORQUE LIMITER FOR A RIGHT ANGLE INDEXER

(75) Inventors: Joseph F. Ondrus, Jr., St. Louis; Melvin John Meyer, St. Charles, both of MO (US)

(73) Assignee: Crane Co., St. Louis, MO (US)

( * ) Notice: Subject to any disclaimer, the term of this patent is extended or adjusted under 35 U.S.C. 154(b) by 0 days.

(21) Appl. No.: 09/669,340

(22) Filed: Sep. 26, 2000

Related U.S. Application Data

(63) Continuation-in-part of application No. 09/422,770, filed on Oct. 22, 1999.

(51) Int. Cl.$^7$ .................................................. F16D 7/04
(52) U.S. Cl. ......................... 464/37; 192/56.62; 464/38; 464/39
(58) Field of Search ...................... 192/56.62; 464/37, 464/38, 39

(56) References Cited

U.S. PATENT DOCUMENTS

| | | |
|---|---|---|
| 1,136,739 | 4/1915 | Tiffany . |
| 1,541,489 | 6/1925 | Ely . |
| 1,566,553 | 12/1925 | Maisch . |
| 1,833,164 | 11/1931 | Jaenichen . |
| 2,300,778 | 11/1942 | Cornwall . |
| 2,746,691 | 5/1956 | Hoad . |
| 2,771,171 | 11/1956 | Schultz . |
| 2,818,712 | 1/1958 | Barnes et al. . |
| 2,885,873 | 5/1959 | Beeston, Jr. . |
| 2,943,216 | 6/1960 | Spodig . |
| 3,050,965 | 8/1962 | Landrum . |
| 3,053,365 | 9/1962 | Allen . |
| 3,148,499 | 9/1964 | Tringali . |
| 3,159,725 | 12/1964 | Dennis . |
| 3,221,389 | 12/1965 | Cowell . |
| 3,277,669 | 10/1966 | Woolley . |
| 3,339,819 | 9/1967 | Gollos . |
| 3,680,673 | 8/1972 | Webb . |
| 3,701,404 | 10/1972 | Cassell . |
| 3,722,644 | 3/1973 | Steinhagen . |
| 3,774,738 | 11/1973 | Steinhagen . |
| 3,817,116 | 6/1974 | Georgieff . |
| 3,866,728 | 2/1975 | Orwin . |
| 3,893,553 | 7/1975 | Hansen . |
| 3,927,537 | 12/1975 | Anderson et al. . |
| 3,930,382 | 1/1976 | Timtner . |
| 3,942,238 | 3/1976 | Dore . |
| 3,942,337 | 3/1976 | Leonard et al. . |
| 3,979,925 | 9/1976 | Kato . |
| 3,981,382 | 9/1976 | Bolliger . |
| 4,006,608 | 2/1977 | Vuceta . |
| 4,046,237 | 9/1977 | Root et al. . |

(List continued on next page.)

FOREIGN PATENT DOCUMENTS 5-164154 * 6/1993 (JP) ........................................ 464/38

Primary Examiner—Lynne H. Browne
Assistant Examiner—Aaron Dunwoody
(74) Attorney, Agent, or Firm—Paul M. Denk

(57) ABSTRACT

A right angle indexer includes an internal torque limiter. The indexer includes an input shaft with a cam, and an output shaft. The cam on the input shaft rotates a hub on the output shaft. The hub is rotatable relative to the output shaft. The output shaft has a driven surface, and the hub has a drive surface. The drive surface includes a plurality of detents which are irregularly spaced about the drive surface. A plurality of rollers are spaced irregularly about the driven surface. The driven plate is biased into contact with the drive plate, and the rollers are received in the drive plate detents. As long as the rollers are engaged in the drive plate detents, rotation of the hub by the cam will cause the driven plate, and hence the output shaft, to rotate. However, if a predetermined torque load is exceeded, the driven plate will become disengaged from the drive plate, and continued rotation of the hub will not cause rotation of the driven plate or the output shaft.

2 Claims, 7 Drawing Sheets

U.S. PATENT DOCUMENTS

| | | |
|---|---|---|
| 4,174,621 | 11/1979 | Woltjen . |
| 4,373,923 | 2/1983 | Kilwin . |
| 4,746,320 | 5/1988 | Kilwin . |
| 4,828,095 | 5/1989 | Kilwin . |

* cited by examiner

INTERNAL TORQUE LIMITER FOR A RIGHT ANGLE INDEXER

CROSS-REFERENCE TO RELATED APPLICATIONS

This application is a continuation-in-part application of copending application Ser. No. 09/422,770 filed Oct. 22, 1999, entitled Internal Torque Limiter For A Parallel Indexer, which is incorporated herein by reference.

STATEMENT REGARDING FEDERALLY SPONSORED RESEARCH OR DEVELOPMENT

Not Applicable.

BACKGROUND OF THE INVENTION

This invention relates to an internal overload clutch assembly which permits rotation between a rotating member and a rotatable member during normal operation, but which disconnects the rotating and rotatable members from each other when a maximum torque is exceeded.

In order to couple and uncouple drive shafts from driven shafts, a variety of styles of torque overload clutches or couplings have been developed. While prior art developments in torque overload clutches has been extensive, they can be generally described according to their construction and operation. Many of these clutch or coupling devices are in the category of flexible couplings which provide transmission of the driving, rotational, or torque force from a drive shaft to the intended driven shaft, but which are capable of disconnection when a binding force creates an excessive torque causing significantly reduced turning of a mechanical operator on a work component. In certain cases, the flexible couplings are provided with safety features which prevent excessive torque forces on the driven shaft from damaging the drive means and/or its prime mover. Many of the safety devices employed in flexible couplings include magnetically activated torque coupler devices as shown, for example, in U.S. Pat. No. 2,771,171. Another variety of magnetic coupling-clutch devices is shown in U.S. Pat. Nos. 3,221,389 and 3,339,819 which use mechanical elements that engage/disengage relative to one another, together with permanent magnets. Further types of magnetic torque limiting devices used in low force operating mechanisms, such as phonograph record players or sound recorders, are shown in U.S. Pat. Nos. 1,136,739 and 2,300,778. Other types of magnetic couplers include those which have spring biasing to determine the degree of force necessary for disengaging the coupling as shown in U.S. Pat. No. 3,053,365. Other forms of connectors which have utilized permanent magnet designs for effecting torque control are shown in U.S. Pat. Nos. 3,277,669, 3,159,725, 2,943,216 and 2,885,873; and those types of magnetic couplers which use a frictional connection between magnets to determine the degree of torque necessary to effect uncoupling of the torque limiting device as shown, for example, in U.S. Pat. No. 2,746,691.

In addition to magnetic coupler designs, various mechanical coupling devices, using ball and detent couplings for holding driving and driven parts together until separated by excessive torque are shown in U.S. Pat. Nos. 3,701,404, 3,680,673, 3,893,553, 3,981,382, 3,979,925, 3,942,238, 3,927,537, 3,930,382 and 3,866,728. Some mechanical coupling devices employ ball-bearing type means as the coupling/uncoupling element such as shown in U.S. Pat. Nos. 1,833,164, 3,722,644 and 3,774,738. Other types of power transmitting mechanisms having flexible couplings therein are shown in U.S. Pat. Nos. 1,541,489, 1,566,553, 2,818,712, 3,050,965, 3,148,499, 3,942,337, 4,006,608 and 4,046,237.

Along with the aforementioned categories, there is yet another category which has been developed by inventors employed by the assignee of the present invention. In U.S. Pat. Nos. 4,174,621 and 4,373,923, this particular type of mechanical torque limiting overload coupling/clutching device has been disclosed. In both of these patents, an improved overload torque coupler/clutch device has been developed in which suspended ball detents are used to interconnect rotating and rotatable members during normal operation, but upon encountering an excessive torque force on the rotatable member, suspended ball detents are shifted against a resilient spring out of seating engagement to disconnect the rotating and rotatable members. This improved style of torque limiting overload coupling minimizes rotational back lash or looseness, while maintaining precision operation of the rotatable member. In addition, a more precise and consistent de-coupling of the assembly is provided when a trip torque is encountered, and significant damage to the ball detents has been minimized. Such torque limiting overload coupling devices have been particularly useful in conjunction with cam indexing systems such as shown in U.S. Pat. No. 3,817,116, for example, which is also assigned to the same assignee of the present invention. The construction and operation of such cam operation systems include the use of radially mounted cam followers which are indexed by specifically designed multi-ribbed cams. The cam surfaces engage cam followers mounted on a hub to provide accurate positioning, while allowing clearance between adjacent cam followers. Mechanical torque limiting overload couplings which have been employed in conjunction with such cam indexing systems, have been operated as separate components, separate from, but operative with such systems. Thus, a typical set up would include a cam index system, with or without a separate speed reducer, and also a separately mounted torque limiting overload coupling which is mounted outside the housing of the cam index system, but which couples/uncouples the output driven shaft or flange thereof, to connect and disconnect the drive shaft or prime mover when an excessive torque is encountered.

In certain industries, however, it is necessary to expose all of the aforementioned mechanical components and driving systems to daily cleaning. In the dairy industry, for example, the incidence of salmonella poisoning or other contamination requires daily washing of operating machine components. This subjects the operating machine components to unnecessary exposure to moisture and deterioration, even though stainless steel may be used in the construction thereof. This has created a need for a self enclosed torque limiting clutch assembly which is contained in the same housing as the indexing system or prime mover. While it may appear at first sight that this would not require extensive engineering design and improvement in view of the highly developed nature of the prior art in this field, in actual fact; however, the development of the present invention did not come easily. Numerous designs were conceived and tested, some including magnetic coupler devices, but were unsuccessful. After much development and testing the internal overload clutch assembly of U.S. Pat. No. 4,828,095, which is also assigned to the same assignee of the present invention and which is incorporated herein by reference, was developed. The overload clutch assembly of that patent, however, was developed for use with a right angle indexer. There, however, is a need for an internal overload clutch assembly which can be used in parallel shaft indexers.

BRIEF SUMMARY OF THE INVENTION

Right angle and parallel indexers are disclosed. The indexers have a housing through which a rotatable input shaft extends. A cam on is mounted on input shaft to rotate with the input shaft. The indexers each include an output shaft. The output shaft for the parallel indexer is parallel to the input shaft; and the output shaft for the right angle indexer is substantially perpendicular to the input shaft.

A hub is rotatably mounted on the output shaft. The hub for the right angle indexer has a peripheral edge and a front edge. A plurality rollers are mounted in the peripheral edge to rotate in a plane substantially perpendicular to a plane of the hub. The cam engages the rollers and is shaped to move the rollers as the cam is rotated, to cause the hub to rotate about an axis.

The indexer has a drive surface which rotates with the hub. Preferably, the drive surface is formed on a drive plate which is fixed to a forward surface of the hub. The drive surface has a plurality of detents irregularly staggered around the drive surface.

The indexer also has driven surface which rotates with the output shaft. The driven surface faces and abuts the drive surface. Preferably, the driven surface is formed on a driven plate, which is fixed to the output shaft. The driven surface includes a plurality of slots irregularly staggered around the driven surface. The driven surface slots are alignable with the drive surface detents. Rollers mounted in the driven surface slots and are received in the drive surface detents.

A resilient member (preferably a spring) is mounted about said output shaft so as to apply a spring force to the rollers to maintain the driven surface rollers in the drive surface detents. Thus, rotation of the hub and the drive surface rotates the driven surface, and hence the output shaft. However, when a specified torque is exceeded, the rollers will disengage from the drive surface detents to disengage the output shaft from the hub.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes what we presently believe to be the best mode of carrying out the invention.

Figure 1:
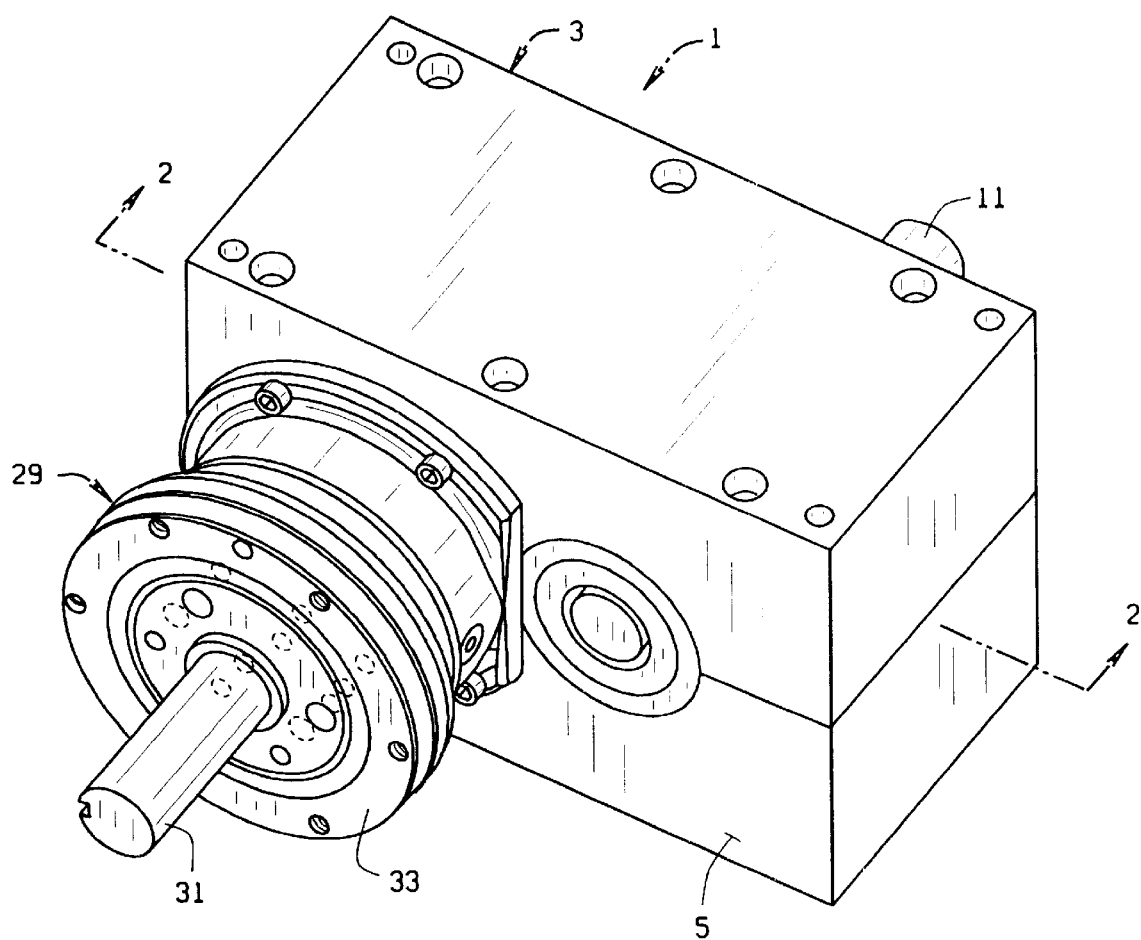
FIG. 1 is a perspective view of a parallel shaft indexer which includes an internal overload clutch assembly of the present invention.

A parallel indexer 1 is shown generally in FIG. 1. The indexer 1 includes a housing 3 having a front face 5 and a back face 7. An input shaft 11 extends rearwardly from back face 7 to be connected to a prime mover (not shown), such as an electrical motor, which rotates the input shaft 11. The input shaft 11 is rotatably journaled in front and rear bearing assemblies 13, 14 which, in turn are mounted in front and rear bushings 16 and 17. A pair of cams 21 are mounted on the input shaft 11 within the housing 3. The cams 21 are spaced apart by a spacer 23 which is integral with the shaft 11. The cams 21 are rotationally fixed to the input shaft 11 to rotate with the shaft as the shaft 11 is rotated by the prime mover.

A torque limiter housing 29 is mounted to the housing front face 5. An output shaft 31 extends from the housing back face 7, through the housing 3 and the torque limiter housing 29 to extend out the front 33 of the torque limiter housing 29. The output shaft 31 is rotatably journaled in rear bearing assembly 35 mounted in the back face 7 of the housing 3 and a front bearing assembly 37 mounted in the front 33 of the torque limiter housing 29. The output shaft 31 has a first portion 39 which is journaled in the back bearing assembly 35 and extends the width of the housing 3. In the torque limiter housing 29, the output shaft 31 is stepped at 31a, 31b, and 31c to form sections of increasing diameter. Externally of the torque limiter housing 29, the output shaft 31 is stepped down as at 31d to be the same diameter as the first section 39. Although the output shaft 31 is stepped down to be the same diameter as the first section 39, this is not necessary.

A hub 41 is mounted on the output shaft first section 39. The hub 41 includes a sleeve 43 from which three plates 45, 46, and 47 extend. The plates 45–47 each have a series of holes 49 extending around the periphery of the plates. The holes 49 of the plates 45–47 are aligned with each other. Rollers 51 are mounted between plates 45 and 46 and between plates 46 and 47. The rollers 51 are rotatably mounted on rods 52 which extend through the aligned holes 49 of the plates 45–47. The input and output shafts 11 and 31 are positioned relative to each other so that the cams 21 extend into the space between the plates 45–47 so that the cams 21 will engage the rollers 51 as the cams are turned by the rotating action of the input shaft. When the cams 21 do engage the rollers 51, the rollers 51 are pushed by the cams 21 to cause the hub 41 to rotate about its axis. The hub sleeve 43 is not fixed to the output shaft first section 39, and, as will be discussed below, the hub 41 and output shaft 31 can rotate relative to each other. The forward portion 53 of the hub 41 has an increased diameter to form a larger front surface 55. A series of holes 57 are formed in the hub's front surface 55.

A torque limiter 61 is contained within the torque limiter housing 29. The torque limiter 61 is fully enclosed in the housing 3 and the torque limiter housing 29. Thus, the indexer 1 can be used in environments in which exposed limiters cannot be used, such as environments in which the limiters would require extensive cleaning to remain operational or to continue to be used for a specific purpose.

The torque limiter includes a drive plate 63 is positioned about the output shaft portion 31a to be adjacent the hub front surface 55. The drive plate 63 includes a series of pin holes 65 which extend through the plate. The pin holes 65 of the drive plate are alignable with the holes 57 in the front surface 55 of the hub 41. Pins 67 are passed through the drive plate pin holes 65 and into the hub holes 57 to rotationally fix the drive plate 63 relative to the hub 41. Thus, as the hub 41 is rotated by the cams 21, the drive plate 63 will also rotate. The drive plate 63 also includes a series of seats or detents 69 around the periphery of the plate. The seats 69 are preferably radially extending in plan and semi-circular in cross-section. The seats 69 are not regularly spaced about the drive plate 63.

A driven plate 71 is positioned adjacent the drive plate 63 around the output shaft section 31a. The driven plate 71 includes a series of pin holes 73 which accept pins 75. The pins 75 extend into holes 77 in the rear face 79 of the output shaft section 31b. The driven plate 71 also includes a plurality of slots 81 which extend radially inwardly from the outer edge 83 of the driven plate. The driven plate slots 81 are not evenly spaced about the edge of the driven plate 71. However, the drive plate seats 69 and the driven plate slots are alignable with each other. Thus, for each driven plate slot 81, there is a corresponding drive plate seat 69. A roller 83 is received in each driven plate slot 81. The driven plate 71 has a circumferential slot 85 which receives a lock ring 87 or the like to hold the rollers 83 in the driven plate slots 81. The rollers 83 are sized, such that they are also seated in the drive plate seats 69. The engagement of the rollers 83 with the drive plate 63 is such that, as the drive plate 63 is rotated, the drive plate 63 will rotate the driven plate 71. Because the driven plate 71 is rotationally fixed to the output shaft 31, the rotation of the driven plate 71 by the drive plate 63 will cause the output shaft to rotate.

A switch flange 91 is positioned about the output shaft section 31b. The switch flange 91 and the driven plate 71 each form seats 93 and 94 on which a thrust washer 97 and a thrust bearing 99 are positioned. A compression ring 101 is mounted around the output shaft section 31b. The compression ring 101 includes a plurality of posts 103 on which spiral springs 105 are mounted. The springs 105 press against the switch flange 91. Three adjusting screws 107 extend through openings 109 in the front face of the output shaft section 31c to engage the compression ring 101. The screws 107 can be adjusted to alter the load force applied by the springs 105 on the switch flange 91.

In operation, the input shaft 11 and cams 21 are rotated by the prime mover. The rollers (or followers) 51 on the hub 41 are engaged by the cams 21, and the rotation of the cams causes the hub 41 to incrementally rotate about the output shaft first section 39. The drive plate 63 of the torque limiter 61 is fixed to the hub 41, and hence rotates about the output shaft 31 with the hub 41. The driven plate 71 is separate from the drive plate 63 and its rollers 83 engage the seats 69 of the drive plate 63. The compression load of the springs 105 load the switch flange 101, which in turn loads the thrust washers 97 and thrust bearings 99. This force is applied directly to the rollers 83 keeping them in the drive plate seats 69. Thus, the driven plate 71, and hence the output shaft 31, is rotated by the drive plate 63. When a set torque is exceeded, the rollers 83 will overcome the force of the springs 105, and will become disengaged from the drive plate seats 69. Thus, the driven plate 71 and the drive plate 63 will be disengaged from each other. When this occurs, the driven plate 71 and the output shaft 31 will cease to rotate. However, the input shaft 11, the cams 21, and the hub 41 will continue to rotate.

The compression load of the springs 105 determines the torque capacity of the limiter or clutch 61. As noted above, the load of the springs 105 (and hence the torque capacity of the limiter) can be set or adjusted by turning the adjusting screws 107 in equal increments. As the adjusting screws 107 move, the compression ring 101 moves axially along the output shaft 31. The springs 105 are trapped between the compression ring 101 and the switch flange 91. Therefore, the movement of the compression ring 101 (due to adjustment of the screws 107) changes the spring load, and thus the torque capacity of the unit.

The indexer 1 also includes a switch assembly 111 which is responsive to movement of the switch flange 91. The switch assembly is in electrical communication with the prime mover, and when activated, causes the prime mover to be turned off. When the torque limit of the unit is exceeded, the driven plate rollers 83 will come out of the drive plate seats 69 to disengage the driven plate 71 from the drive plate 63. When this occurs, the rollers 83 will move axially in the driven plate slots 81. The rollers 83 are adjacent the switch flange 91, and the movement of the rollers, as they become disengaged from the drive plate seats 69, will cause the switch flange 91 to move axially away from the drive plate 63. The change in position of the switch flange 91 will cause the switch assembly 111 to activate, and the prime mover will cease operations.

As noted above, the driven plate slots 81 and the drive plate seats 69 are irregularly spaced around the driven plate 71 and the drive plate 63, respectively. Thus, when the drive plate 63 and driven plate 71 are disengaged from each other by a torque overload condition, it will require a full revolution of the drive plate 63 before the drive plate 63 and driven plate 71 are again engaged with each other. Even though the prime mover is shut down upon disengagement of the driven plate 71 from the drive plate 63, usually there is sufficient motion in the hub to make a complete revolution. Thus, the limiter will automatically be reset so that the driven plate rollers 83 are again received in the drive plate seats 69.

Figure 5:
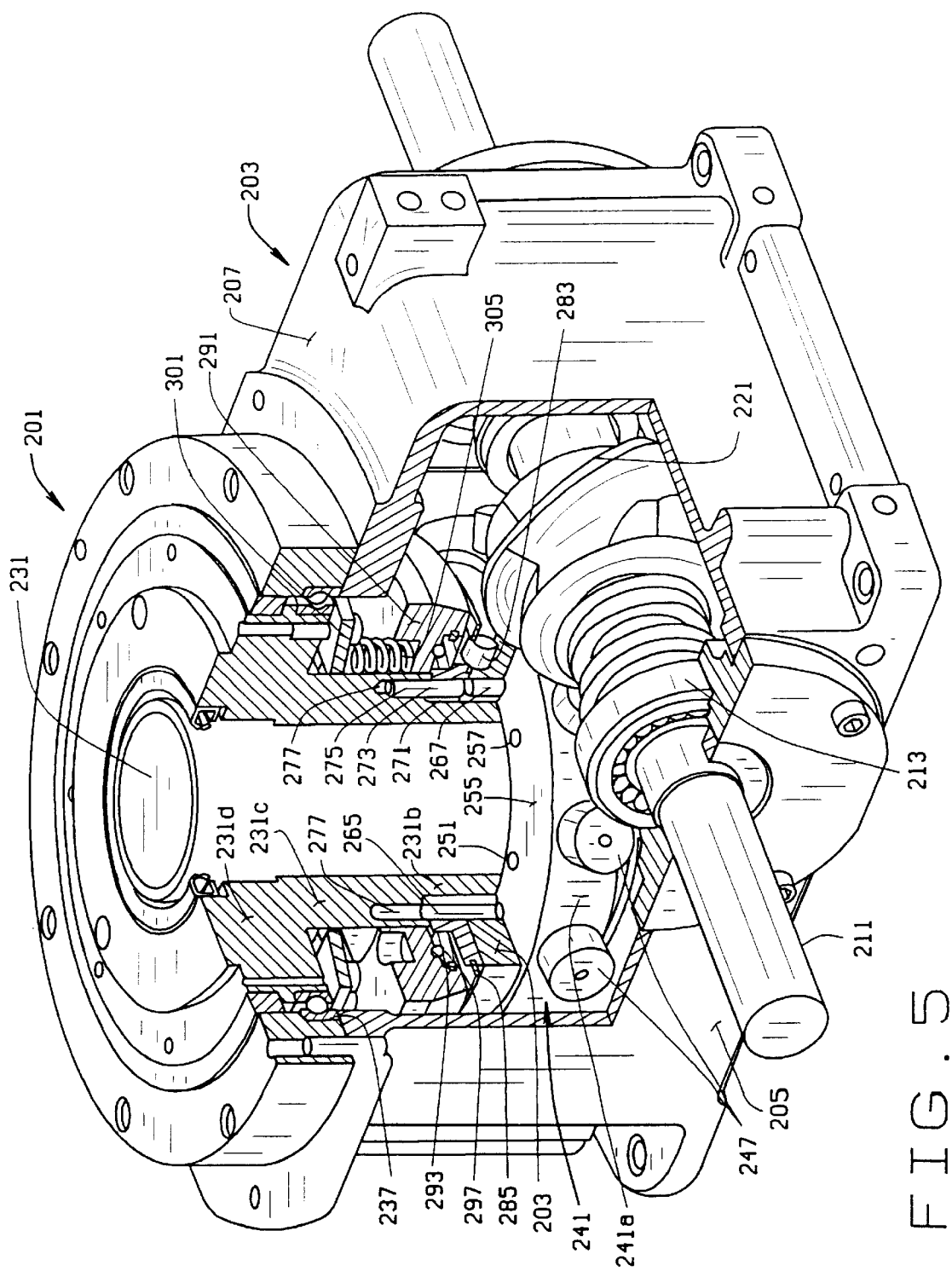
FIG. 5 is a perspective view, partly in cross-section, of a right angle indexer.
Figure 6:
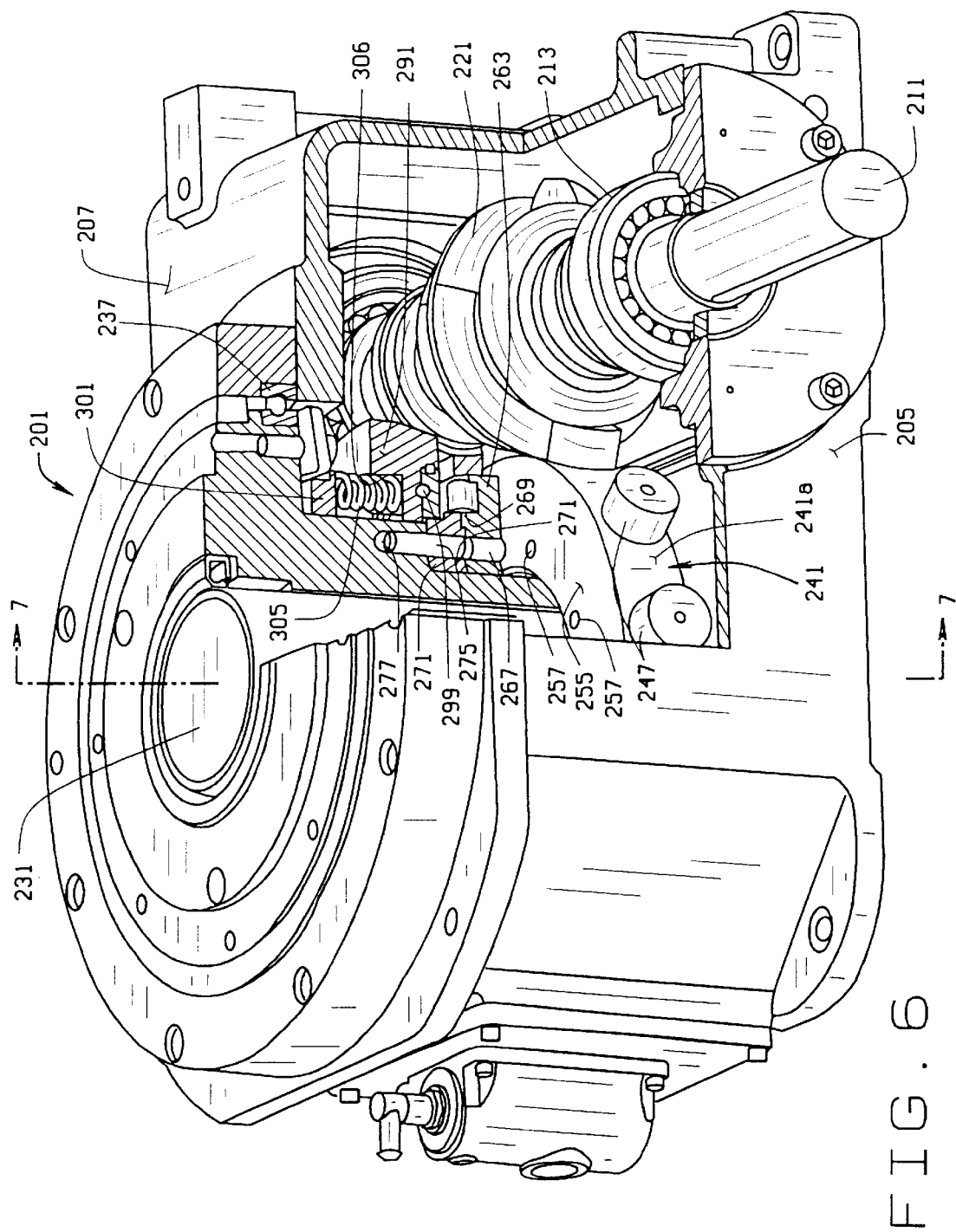
FIG. 6 is another perspective view, partly in cross-section, of the right angle indexer.
Figure 7:
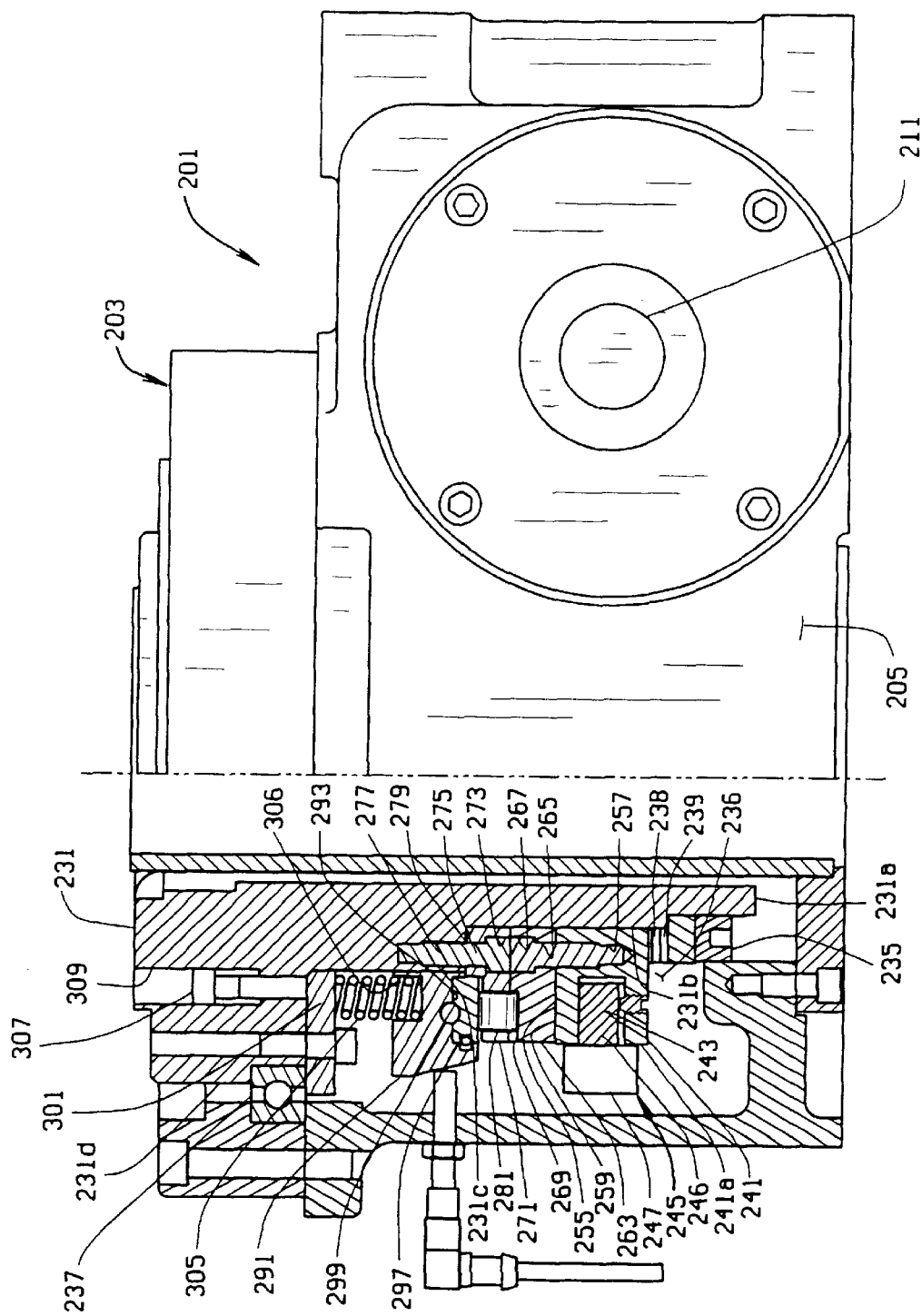
FIG. 7 is a cross-sectional view of the right angle indexer taken along line 7—7 of FIG. 6.

A right angle indexer 201 is shown in FIGS. 5–7. The indexer 201 includes a housing 203 having opposed front and back faces 205 and opposed side faces 207. An input shaft 211 extends through the housing 203 between the front and back faces and is connected to a prime mover (not shown), such as an electrical motor, which rotates the input shaft 211. The input shaft 211 is rotatably journaled in front and rear bearing assemblies 213 which, in turn are mounted in front and rear bushings. A cam 221 is mounted on the input shaft 211 to be rotated with the shaft 211. The cam 221 is substantially the same shape as the cam shown and described in co-owned U.S. Pat. No. 4,828,095, which is incorporated herein by reference.

An output shaft 231 extends from the housing side face 207 at a right angle to the input shaft 211. The output shaft 231 is rotatably journaled in a single bearing assembly 237 which is mounted in the housing 3. The output shaft 231 has a first portion 231a which has a clamping locknut 235. The clamping locknut 235 is at an opposite end of the shaft from the bearing assembly 237. Forwardly of the locknut assembly 235, the output shaft 231 is stepped outwardly as at 231b, 231c, and 231d, to define sections of increasing diameter. The forward most section, 231d, is journaled in the bearing assembly 237.

The clamping nut 235 forces a thrust washer 236 against the rearward face of output shaft section 231b. A thrust bearing 238 and thrust washer 239 are positioned on output shaft section 231b between a thrust ring and hub 241 so as to prevent axial motion of hub 241 on output shaft section 231b.

A hub 241 is mounted on the output shaft section 231b. The hub is substantially similar to the hub shown in the above noted U.S. Pat. No. 4,828,095, which is incorporated herein by reference. The hub 241 is circular in plan, having a periphery 241a. A plurality of bores 243 are formed in the hub periphery, evenly spaced about the hub periphery. Roller assemblies 245, having a stem 246 which is received in the bore 243, and a roller 247 which is rotatably mounted to the end of the stem 246. The roller 247 rolls in a plane horizontal to the plane of the hub 241. The output shaft 231, with the hub 241 and rollers 247, and the input shaft 211 are positioned relative to each other so that the cam 221 engages the rollers 247. The camming surface of the cam is sloped, such that, as the camming surface engages the roller 247, the camming surface will push the roller, causing the hub 241 to rotate about its axis. As with the indexer 1 (of FIGS. 1–3), the hub 241 is not fixed to the output shaft 231, and the hub 241 can rotate about the shaft 231.

The hub 241 has a front face 255 in which a series of holes 257 are formed.

A drive plate 263 is positioned about the out put shaft portion 231b to be adjacent the hub front surface 255. The drive plate 263 includes a series of pin holes 265 which extend through the plate. The pin holes 265 of the drive plate are alignable with the holes 257 in the hub front surface 255. Pins 267 are passed through the drive plate pin holes 265 and into the hub holes 257 to rotationally fix the drive plate 263 relative to the hub 241. Thus, as the hub 241 is rotated by the cams 221, the drive plate 263 will also rotate. The drive plate 263 is identical to the drive plate 63 of indexer 1 and includes a series of seat s or detents 269 around the periphery of the plate. T he s eats 269 are preferably radially extending in plan and semi-circular in cross-section. The seats 269 are not regularly spaced about t he drive plate 263.

A driven plate 271 is positioned adjacent the drive plate 263 around the output shaft section 231b. The driven plate 271 is identical to the driven plate 71 of the indexer a and includes a series of pin holes 273 which accept pins 275. The pins 275 extend into holes 277 in the rear face 279 of the output shaft section 231c. The driven plate 271 also includes a plurality of slots 281 which extend radially inwardly from the outer edge of the driven plate. The driven plate slots 281 are not evenly spaced about the edge of the driven plate 271. However, the drive plate seats 269 and the driven plate slots 281 are alignable with each other. Thus, for each driven plate slot 281, there is a corresponding drive plate seat 269. A roller 283 is received in each driven plate slot 281. The driven plate 271 has a circumferential slot which receives a lock ring 285 or the like to hold the rollers 283 in the driven plate slots 281. The rollers 283 are sized, such that they are also seated in the drive plate seats 269. The engagement of the rollers 283 with the drive plate 263 is such that, as the drive plate 263 is rotated, the drive plate 263 will rotate the driven plate 271. Because the driven plate 271 is rotationally fixed to the output shaft 231, the rotation of the driven plate 271 by the drive plate 263 will cause the output shaft 231 to rotate.

A switch flange 291 is positioned about the output shaft section 231c. The switch flange 291 forms a groove 293 on a back side of the flange 291 in which a series of balls 299 and a thrust washer 297 are positioned. A compression ring 301 is mounted around the output shaft section 231c adjacent a back surface of the output shaft section 231d. A plurality of springs 305 extend between the compression ring 301 and a front face of the switch flange 291. The springs 305 are received in pockets 306 in the front face of the switch flange 291. Three adjusting screws 307 extend through openings 309 in the front face of the output shaft section 231d to engage the compression ring 301. The screws 307 can be adjusted to alter the load force applied by the springs 305 on the switch flange 291.

Figure 2:
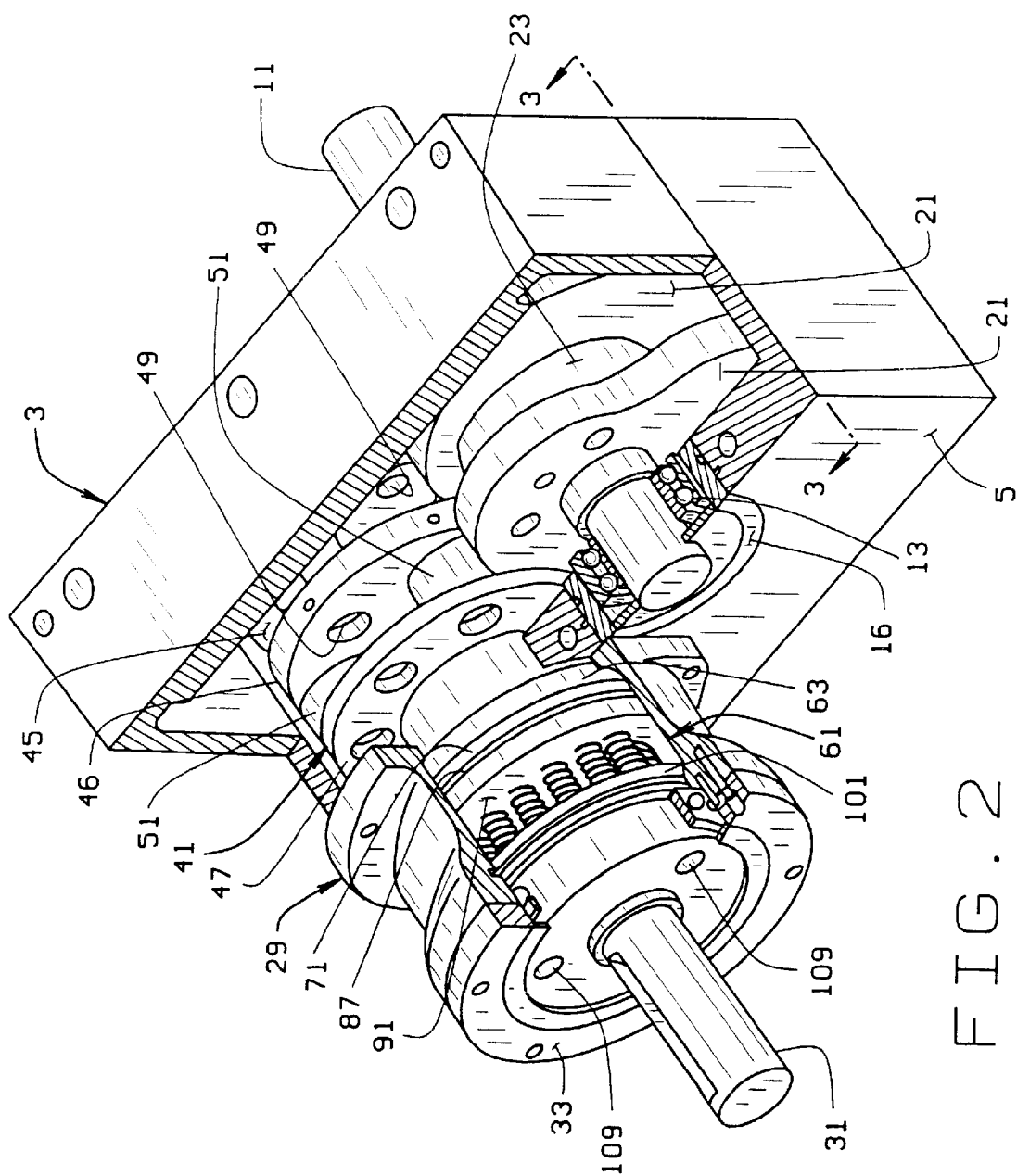
FIG. 2 is a side elevational view, partly in section, showing the combined prime mover/internal overload clutch assembly construction of the present invention as taken along lines 2—2 of FIG. 1.
Figure 3:
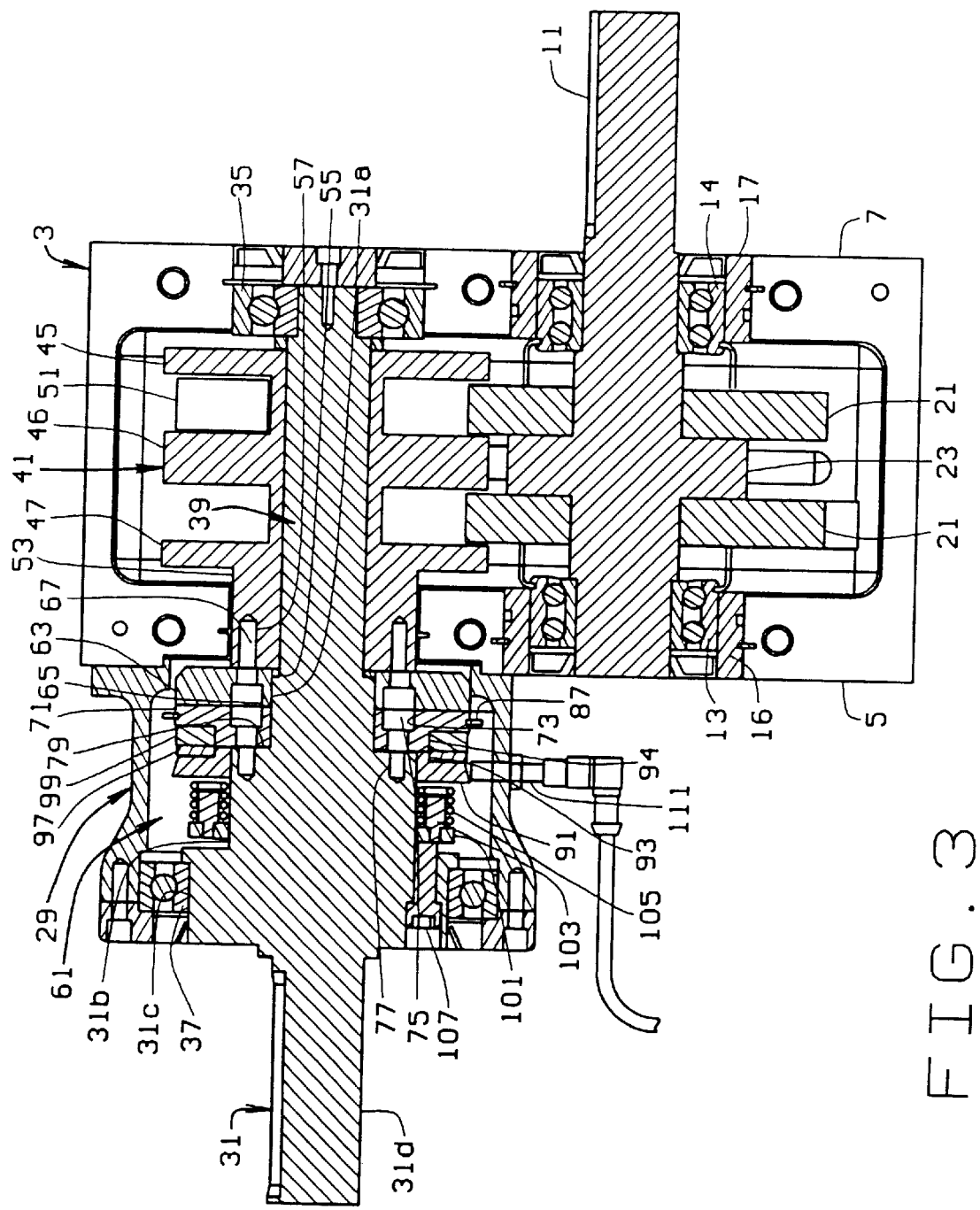
FIG. 3 is a cross-sectional view of the indexer taken along line 3—3 of FIG. 2.
Figure 4:
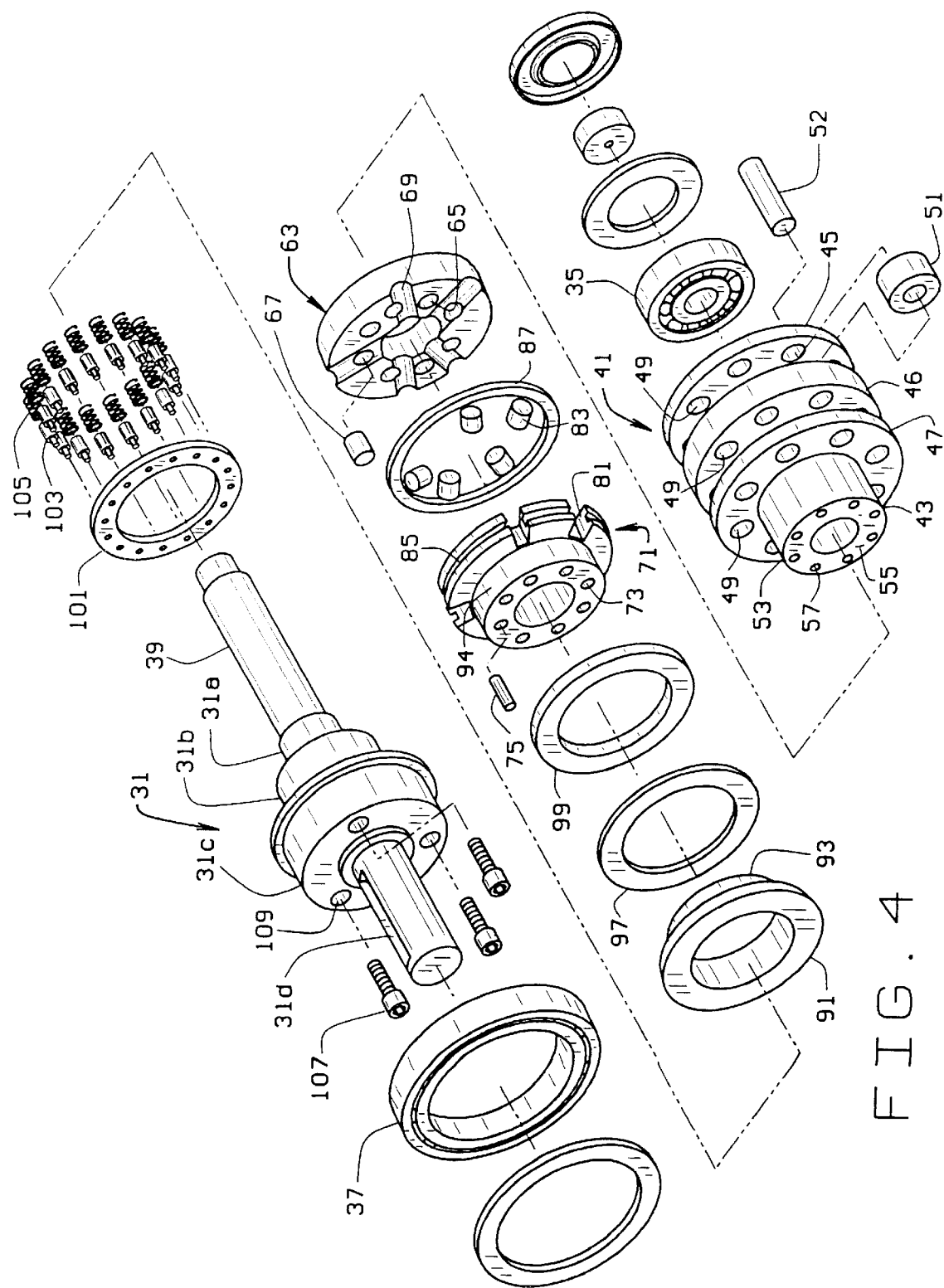
FIG. 4 is an exploded perspective view of the internal overload clutch assembly of the present invention.

As can be appreciated, the operation of the right angle indexer 201 is substantially the same as that of the parallel indexer 1. The torque limiter, which essentially comprises the drive plate 263, the driven plate 271, the rollers 283, the compression ring 301 and the springs 305 is substantially the same as the torque limiter 91 of the indexer 1. The major difference between the right angle indexer 201 of FIGS. 5–6 and the parallel indexer of FIGS. 1–3 is that the change in direction of the output shaft (i.e., perpendicular to, versus parallel to, the input shaft), the design of the hub, and the design of the cams. Otherwise, the torque limiter for both embodiments is substantially as shown in FIG. 4.

As various changes could be made in the above constructions without departing from the scope of the invention, it is intended that all matter contained in the above description or shown in the accompanying drawings shall be interpreted as illustrative and not in a limiting sense. For example, the spiral springs 105 can be replaced with other types of resilient members which will apply a load to the rollers 86. For example, a spring washer could be used. Even an annular foam ring could be used, as long as the foam is resilient. The drive plate 63 could be integrally formed with the hub 41. Similarly, the driven plate could be integrally formed with the output shaft 31. These examples are merely illustrative.

What is claimed is:

1. A right angle indexer having an indexer portion and an associated internal torque limiter, the right angle indexer comprising:

a housing which encloses both said indexer portion and said internal torque limiter; said housing comprising an indexer housing and a torque limiter housing, said torque limiter housing communicating with, and being integral with, said indexer housing, such that said internal torque limiter is protected from the atmosphere in which said indexer operates; said indexer portion comprising:

a input shaft rotatably mounted in said indexer housing;

a cam on said input shaft, said cam rotating with rotation of the input shaft;

an output shaft substantially perpendicular to the input shaft and extending through said torque limiter housing;

a hub rotatably mounted on the output shaft to be rotatable about the output shaft and having a peripheral edge and a front edge; a plurality of rollers mounted in said peripheral edge, said rollers being rotatable in a plane substantially perpendicular to a plane of said hub; said cam engaging said rollers and being shaped to move said rollers as said cam is rotated, to cause said hub to rotate about an axis;

said internal torque limiter surrounding said output shaft and comprising:

a drive surface which rotates with said hub; said drive surface having a plurality of detents irregularly staggered around the drive surface;

a driven surface which rotates with the output shaft; the driven surface including a plurality of slots irregularly staggered around the driven surface; the driven surface slots being alignable with the drive surface detents; rollers mounted in said driven surface slots; the rollers being received in the drive surface detents;

a resilient member mounted about said output shaft so as to apply a spring force to the rollers to maintain the driven surface rollers in the drive surface detents; whereby, rotation of the hub and the drive surface rotates the driven surface, and hence the output shaft, and whereby, when a specified torque is exceeded, the rollers will disengage from the drive surface detents to disengage the output shaft from the hub; and at least one externally accessible adjustment screw which operatively engage the resilient member, whereby, rotation of at least one adjustment screw in one direction will increase the spring pressure and rotation of the at least one adjustment screw in an opposite direction will reduce the spring pressure.

2. The right angle indexer of claim 1 wherein the resilient member comprises a plurality of spiral springs; said torque limiter further including a compression ring; said springs being sandwiched between said compression spring and said driven surface; said at least one adjustment screw engaging said compression plate whereby rotation of said adjustment screw adjusts the position of said compression plate relative to said driven surface.

* * * * *